Patented Nov. 24, 1942

2,303,272

UNITED STATES PATENT OFFICE 2,303,272

METAL ALLOY

Roy A. Haskell, Waukegan, Ill., assignor to Fansteel Metallurgical Corporation, North Chicago, Ill., a corporation of New York No Drawing. Application September 18, 1941, Serial No. 411,343

2 Claims. (Cl. 75—173)

This invention relates to alloys particularly suited for soldering and brazing purposes, and is concerned more particularly with the novel alloy especially adapted for uniting metal carbide-containing bodies to steel-supporting bodies. Metal carbide-containing bodies of the sintered and cast types have in the past few years proved increasingly popular as metal-cutting and forming tools, because of the enhanced production obtainable by their use. Because of the relatively high cost, present unit weight and low transverse rupture strength, it is customary to mount tips or bits of these metals on steel shanks. These tips were originally secured to the shanks by copper Tobin bronze, and other low-temperature alloy brazing. However, a consideration of the requirements which the brazing alloy must satisfy makes it evident that these materials are more nearly ideal for this purpose. Ductility is desirable so that the alloy can be rolled out in convenient form to be cut to shape for use. High compressive strength is necessary because of the high loads placed on the tips of the finished cutting tools. The hard carbides have an enormous cutting capacity, with the result that the large amount of metal removed in a single piece puts loads far greater than any heretofore contemplated. A relatively high melting point is necessary, because the cutting of such large metal chips results in the generation of a large amount of heat at the point of the tip; yet the melting point must not be too high. First, an excessively high temperature will have an adverse effect upon the steel shank employed for mounting the tip. Second, the material of the tip has a widely different coefficient of thermal expansion from that of the steel shank. Hence stresses are inevitably set up in the cooling following the brazing operation, which should be kept at a minimum.

High wetting ability is desirable so that a firm bond can be had between the parts secured together. While copper will satisfy this requirement if the hard metal consists entirely of tungsten carbide, it has proved much less successful in the securing of carbide bodies containing relatively large amounts of refractory metal carbides of the fourth and fifth groups of the periodic table. Inasmuch as these latter-named carbides greatly enhance the qualities of carbide bodies for steel-cutting they are in increasing demand.

In addition to the foregoing special requirements, such other desirable qualities as are common to brazing alloys of this general character are of course desirable also. These include, for example, easy flow, resistance to atmospheric oxidation and plasticity over a reasonable temperature range.

My new alloy satisfies these requirements to an admirable degree. The ranges of proportions of the ingredients are as follows:

| | |
|---|---|
| Silver | 47.5 to 58 |
| Copper | 36 to 47 |
| Nickel | 2.5 to 9 |
| Manganese | tr. to 3 |

The silver and copper employed impart malleability and ductility, with the silver keeping the melting point within the desired range. The nickel contributes strength and is particularly valuable in causing the alloy to effectively wet the carbides of the fourth and fifth groups. The manganese employed serves to purify the alloy and eliminate oxidation. It has been observed that not all of the manganese added to the original melt appears in the final alloy. Small amounts of other elements may be present without vitiating the objects of the invention, but it is pointed out that the presence of zinc or cadmium generally characteristic in alloys of this type is not to be desired because of their tendency to lower the melting point, lower the strength of the material and render it more susceptible to oxidation.

More specifically, I have found that a highly desirable alloy for my purpose can be had by the melting together of the following ingredients:

| | Per cent |
|---|---|
| Silver | 54 |
| Copper | 40 |
| Nickel | 5 |
| Manganese | 1 |

I am aware that the various ingredients employed in my alloy, together with many others, have heretofore been employed in the manufacture of alloys for brazing and other purposes, but the new alloy set forth above appears to be novel in its specific proportions and superior to other known alloys for the purposes set forth.

I claim:

1. An alloy especially suited for uniting hard metal carbide bodies to steel bodies, formed from:

| | Per cent |
|---|---|
| Silver | 47.5 to 58 |
| Copper | 36 to 47 |
| Nickel | 2.5 to 9 |
| Manganese | tr. to 3 | and containing little or no cadmium or zinc.

2. An alloy containing approximately:

| | Per cent |
|---|---|
| Silver | 54 |
| Copper | 40 |
| Nickel | 5 |
| Manganese | 1 |

ROY A. HASKELL.